United States Patent [19]

Itoh et al.

[11] Patent Number: 4,871,794

[45] Date of Patent: Oct. 3, 1989

[54] PNEUMATIC TIRES

[75] Inventors: Michio Itoh, Kodaira; Hisao Yamamoto, Higashimurayama; Nobuyuki Okamura, Kodaira, all of Japan

[73] Assignee: Bridgestone Corporation, Tokyo, Japan

[21] Appl. No.: 212,990

[22] Filed: Jun. 29, 1988

[30] Foreign Application Priority Data

Jun. 30, 1987 [JP] Japan .................... 62-160852

[51] Int. Cl.$^4$ ............ C08K 3/04; C08K 5/18; C08L 7/00; C08L 9/06
[52] U.S. Cl. ................ 524/254; 524/495; 525/293; 152/209 R
[58] Field of Search ......... 524/495, 254; 525/293; 152/209 R

[56] References Cited

U.S. PATENT DOCUMENTS

| | | | |
|---|---|---|---|
| 3,953,411 | 4/1976 | Kline | 525/293 |
| 4,155,955 | 5/1979 | Parks | 525/293 |
| 4,257,468 | 3/1981 | Ogawa et al. | 524/495 |
| 4,678,830 | 7/1987 | Sato et al. | 524/495 |
| 4,703,079 | 10/1987 | Almad et al. | 524/495 |

FOREIGN PATENT DOCUMENTS

| | | |
|---|---|---|
| 48-22529 | 3/1973 | Japan . |
| 50-66541 | 6/1975 | Japan . |
| 52-43850 | 4/1977 | Japan . |
| 53-31790 | 3/1978 | Japan . |
| 54-62293 | 5/1979 | Japan . |
| 56-139541 | 10/1981 | Japan . |
| 59-187011 | 10/1984 | Japan . |
| 51982 | 4/1988 | Japan . |

*Primary Examiner*—Allan M. Lieberman
*Attorney, Agent, or Firm*—Sughrue, Mion, Zinn, Macpeak & Seas

[57] ABSTRACT

A pneumatic tire having improved heat resistance and gripping performance is obtained by using as a tread rubber a rubber composition containing particular amounts of specified p-phenylene diamine derivative and specified carbon black.

2 Claims, No Drawings

PNEUMATIC TIRES

BACKGROUND OF THE INVENTION

1. Field of the Invention

This invention relates to pnuumatic tires, and more particularly to a pneumatic tire having improved heat resistance and gripping performance.

2. Related Art Statement

Recently, the use environment of rubber articles has become increasingly severe. Particularly, this tendency has become conspicuous in automobile tires accompanied with the improvement of performances of the automobile, the pavement of roads and the completion of expressway networks. As a result, there is presently a strong demand for the development of pneumatic tires having high running performances, particularly high gripping performance. The gripping performance is an important requirement during acceleration, deceleration and cornering performance of the tire. As the gripping performance becomes higher, it is possible to run the tire at a higher speed.

In order to obtain high gripping performance, it has hitherto been required to select rubber having a high glass transition temperature, such as styrene-butadiene copolymer rubber having a high styrene content or the like, as a tread rubber composition for the tire, or to select a rubber composition containing large amounts of carbon black and process oil to increase the dynamic loss factor (tan δ) of the rubber composition.

Furthermore, in order to improve the decrease of the gripping performance accompanied with the rising of the temperature during the high speed running, Japanese Patent laid open No. 59-187,011 discloses the use of a copolymer rubber obtained by copolymerizing a monomer such as 1,3-butadiene, styrene, isoprene or the like, with an acrylate or methacrylate compound containing diphenylphosphate group, such as diphenyl-2-methacryloyloxyethyl phosphate, diphenyl-2-acryloyloxyethyl phosphate or the like.

When the styrene content in the styrene-butadiene copolymer as the tread rubber composition for providing the high gripping performance increases, however, the gripping performance is certainly improved temporarily, but the value of tan δ undesirably lowers in attendance with the rising of the rubber temperature during the running as a result the gripping performance rapidly decreases.

On the other hand, when selecting a rubber composition containing large amounts of carbon black and process oil, the gripping performance is improved, but the fracture properties and wear resistance are considerably lower due to the addition of a large amount of the additive.

Furthermore, the method of preventing the degradation of the gripping performance with the temperature rising as disclosed in Japanese Patent laid open No. 59-187,011 can not be applied to natural rubber and also has a problem that the properties inherent to the polymer, such as styrene-butadiene copolymer rubber, polybutadiene rubber or the like, are damaged in accordance with the production conditions.

SUMMARY OF THE INVENTION

It is, therefore, an object of the invention to provide a pneumatic tire comprising a tread made from a rubber composition which improves the gripping performance and does not damage the heat resistance and properties inherent to the polymer without adding great amount of carbon black and process oil.

The inventors have made various studies in order to solve the aforementioned problems and found that the gripping performance can be improved without damaging the heat resistance when a p-phenylene diamine derivative having an acryloyl or methacryloyl group, which is known as a reactive antioxidant, is added to the tread rubber composition in an amount larger than the amount used for antioxidation, and as a result the invention has been accomplished.

According to the invention, there is the provision of a pneumatic tire comprising a tread made from a rubber composition, said composition containing 2.5 to 20.0 parts by weight of a derivative of p-phenylene diamine represented by the following general formula:

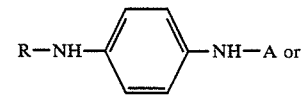

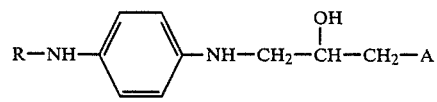

wherein R is an alkyl group, a cycloalkyl group or an aromatic group, and A is an acryloyl group, a methacryloyl group, an acryloyloxy group or a methacryloyloxy group, and 40 to 150 parts by weight of carbon black having a specific surface area of nitrogen adsorption ($N_2SA$ value) of 110–190 $m^2/g$ and a dibutyl phthalate absorption (DBP value) of 100–140 ml/100 g based on 100 parts by weight of rubber ingredient composed of natural rubber and/or synthetic rubber.

DESCRIPTION OF THE PREFERRED EMBODIMENTS

The p-phenylene diamine derivatives used in the invention include, for example, N-methacryloyl-N'-phenyl-p-phenylene diamine, N-(methacryloyloxy-2-hydroxypropyl)-N'-phenyl-p-phenylene diamine, N-methacryloyl-N'-isopropyl-p-phenylene diamine, N-methacryloyl-N'-cyclohexyl-p-phenylene diamine, N-acryloyl-N'-phenyl-p-phenylene diamine, N-(acryloyloxy-2-hydroxypropyl)-N'-phenyl-p-phenylene diamine and the like.

These compounds are previously well-known as a reactive antioxidant.

Moreover, a vulcanization accelerator, an antioxidant, a filler and the like may properly be compounded with the above tread rubber composition.

As to the carbon black, the measurement of $N_2SA$ is performed according to ASTM D3037 and the measurement of DBP is performed according to ASTM D2414.

According to the invention, the amount of the p-phenylene diamine derivative having acryloyl or methacryloyl group is required to be not less than 2.5 parts by weight based on 100 parts by weight of rubber ingredient because when the amount is less than 2.5 parts by weight, the degree of increasing tan δ related to the gripping performance is small and the improving effect is hardly recognized. On the other hand, when the amount exceeds 20 parts by weight, the cost of the rubber composition rises, while the improving effect is undesirably small.

Furthermore, in the tread rubber composition according to the invention, the carbon black having a high reinforceability ($N_2SA$ value: 110–190 m$^2$/g, preferably 110–150 m$^2$/g and DBP value: 100–140 ml/100 g, preferably 100–125 ml/100 g) is required to be compounded in an amount of 40–150 parts by weight based on 100 parts by weight of rubber ingredient. The use of this carbon black is to ensure the wear resistance and low heat build-up in the pneumatic tire.

The following examples are given in illustration of the invention and are not intended as limitations thereof.

A tread rubber composition having a compounding recipe (part by weight) shown in the following Table 1 was prepared and used to manufacture a pneumatic tire. Then, the gripping performance and blow-out temperature of the resulting tire were measured to obtain results shown in Table 1.

Gripping performance

The gripping performance on dry road surface was evaluated by actually running the tire on a circuit consisting of straight course and curved course. Moreover, the gripping performance was represented by an index based on the driver's feeling. The larger the index value, the better the gripping performance.

Blow-out temperature

A vulcanized specimen of about 7 mm×7 mm made from the tread rubber composition was placed in an electric crucible (made by Isuzu Seisakusho K.K.) and then the temperature was raised from 200° C. to 300° C. at an interval of 5° C., provided that the specimen was left to stand at each temperature for about 20 minutes, during which the specimen was taken out from the crucible after left to stand at each temperature and it was visually observed whether or not bubbles occurred in the inside of the sheet. The temperature first beginning the occurrence of bubbles was defined as a blow-out temperature.

The measured results are also shown in Table 1. Moreover, Comparative Examples 1 and 4 in Table 1 are the conventionally used rubber compositions, respectively.

TABLE 1(a)

|  | Comparative Example 1 | Comparative Example 2 | Example 1 | Example 2 | Example 3 | Comparative Example 3 |
| --- | --- | --- | --- | --- | --- | --- |
| Styrene-butadiene rubber *1 | 137.5 | 137.5 | 137.5 | 137.5 | 137.5 | 137.5 |
| Styrene-butadiene rubber *2 | — | — | — | — | — | — |
| Butadiene rubber *3 | — | — | — | — | — | — |
| Natural rubber | — | — | — | — | — | — |
| Carbon black (N220) *4 | 90 | 90 | 90 | 90 | 90 | 90 |
| Carbon black (N110) *5 | — | — | — | — | — | — |
| Process oil (aromatic oil) | 32 | 32 | 32 | 32 | 32 | 32 |
| Stearic acid | 1.0 | 1.0 | 1.0 | 1.0 | 1.0 | 1.0 |
| Paraffin wax | 1.0 | 1.0 | 1.0 | 1.0 | 1.0 | 1.0 |
| Zinc white | 3.0 | 3.0 | 3.0 | 3.0 | 3.0 | 3.0 |
| Antioxidant *6 | 1.0 | 1.0 | 1.0 | 1.0 | 1.0 | 1.0 |
| Vulcanization accelerator *7 | 1.6 | 1.6 | 1.6 | 1.6 | 1.6 | 1.6 |
| Vulcanization accelerator *8 | — | — | — | — | — | — |
| p-phenylene diamine deviative *9 | — | 1.5 | 5.0 | — | — | — |
| p-phenylene diamine deviative *10 | — | — | — | 5.0 | 10.0 | 25.0 |
| Sulfur | 1.5 | 1.5 | 1.5 | 1.5 | 1.5 | 1.5 |
| Gripping perofmance (index) | 100 | 102 | 110 | 109 | 116 | 120 |
| Blow-out temperature (°C.) | 270 | 270 | 265 | 265 | 260 | 230 |

TABLE 1(b)

|  | Comparative Example 4 | Example 4 | Comparative Example 5 | Example 5 | Example 6 | Comparative Example 6 |
| --- | --- | --- | --- | --- | --- | --- |
| Styrene-butadiene rubber *1 | 137.5 | 137.5 | — | — | — | — |
| Styrene-butadiene rubber *2 | — | — | — | — | 30 | — |
| Butadiene rubber *3 | — | — | — | — | — | 30 |
| Natural rubber | — | — | 100 | 100 | 70 | 70 |
| Carbon black (N220) *4 | — | — | 45 | 45 | 45 | 45 |
| Carbon black (N110) *5 | 90 | 90 | — | — | — | — |
| Process oil (aromatic oil) | 32 | 32 | — | — | — | — |
| Stearic acid | 1.0 | 1.0 | 2.0 | 2.0 | 2.0 | 2.0 |
| Paraffin Wax | 1.0 | 1.0 | 1.0 | 1.0 | 1.0 | 1.0 |
| Zinc white | 3.0 | 3.0 | 3.5 | 3.5 | 3.5 | 3.5 |
| Antioxidant *6 | 1.0 | 1.0 | 1.0 | 1.0 | 1.0 | 1.0 |
| Vulcanization accelerator *7 | — | — | — | — | — | — |
| Vulcanization accelerator *8 | — | — | 1.0 | 1.0 | 1.0 | 1.0 |
| p-phenylene diamine deviative *9 | — | 5.0 | — | — | — | — |
| p-phenylene diamine deviative *10 | — | — | — | 3.0 | 3.0 | 1.5 |
| Sulfur | 1.5 | 1.5 | 1.6 | 1.6 | 1.6 | 1.6 |
| Gripping perofmance (index) | 105 | 113 | 100 | 107 | 120 | 115 |

TABLE 1(b)-continued

| | Comparative Example 4 | Example 4 | Comparative Example 5 | Example 5 | Example 6 | Comparative Example 6 |
|---|---|---|---|---|---|---|
| Blow-out temperature (°C.) | 265 | 260 | 195 | 193 | 230 | 225 |

*1 made by Japan Synthetic Rubber Co., Ltd. SBR1712
*2 made by Japan Synthetic Rubber Co., Ltd. SBR1500
*3 made by Japan Synthetic Rubber Co., Ltd. BR01
*4 $N_2SA$: 119 $m^2/g$, DBP: 114 ml/100 g
*5 $N_2SA$: 143 $m^2/g$, DBP: 113 ml/100 g
*6 N—cyclohexyl-N'—phenylene diamine
*7 mixture of 0.2 part by weight of diphenyl guanidine and 1.4 parts by weight of dibenzothiazyl sulfide
*8 N—oxydiethylenebenzothiazyl-2-sulfeneamide
*9 N—(methacryloyloxy-2-hydroxypropyl)-N'—phenyl-p-phenylene diamine
*10 N—methacryloyl-N'—phenyl-p-phenylene diamine As seen from the above, the gripping performance of the tire can largely be raised and the blow-out temperature is hardly lowered by combining p-phenylene diamine derivative with the particular carbon black and adding them to the tread rubber composition in the specified amounts.

That is, the pneumatic tires according to the invention can develop an excellent effect as a high running performance tire.

What is claimed is:

1. A pneumatic tire comprising a tread made from a rubber composition, wherein said rubber composition consists essentially of;

(A) 2.5 to 20.0 parts by weight of a derivative of p-phenylene diamine selected from the group consisting of N-methacryloyl-N'-phenyl-p-phenylene diamine, N-(methacryloyloxy-2-hydroxypropyl)-N'-phenyl-p-phenylene diamine, N-methacryloyl-N'-isopropyl-p-phenylene diamine, N-methacryloyl-N'-cyclohexyl-p-phenylene diamine, N-acryloyl-N'-phenyl-p-phenylene diamine and N-(acryloyloxy-2-hydroxypropyl)-N'-phenyl-p-phenylene diamine, and (B) 40 to 150 parts by weight of carbon black having a specific surface area of nitrogen adsorption ($N_2SA$ value) of 110–190 $m^2/g$ and a dibutyl phthalate adsorption (DBP value) of 100–140 ml/100 g based on 100 parts by weight of a rubber ingredient composed of natural rubber, styrene-butadiene copolymer rubber or a mixture thereof.

2. The pneumatic tire according to claim 1, wherein said carbon black has $N_2SA$ value of 100–150 $m^2/g$ and DBP value of 100–125 ml/100 g.

* * * * *